United States Patent
Wu et al.

(10) Patent No.: US 12,242,877 B2
(45) Date of Patent: Mar. 4, 2025

(54) CONTAINER-ORIENTED LINUX KERNEL VIRTUALIZING SYSTEM AND METHOD THEREOF

(71) Applicant: Huazhong University of Science and Technology, Hubei (CN)

(72) Inventors: Song Wu, Wuhan (CN); Hang Huang, Wuhan (CN); Kun Wang, Wuhan (CN); Honglei Wang, Wuhan (CN); Hai Jin, Wuhan (CN)

( * ) Notice: Subject to any disclaimer, the term of this patent is extended or adjusted under 35 U.S.C. 154(b) by 505 days.

(21) Appl. No.: 17/661,991

(22) Filed: May 4, 2022

(65) Prior Publication Data
US 2023/0092214 A1    Mar. 23, 2023

(30) Foreign Application Priority Data
Sep. 17, 2021    (CN) .......................... 202111097363.8

(51) Int. Cl.
G06F 9/455       (2018.01)
G06F 8/41        (2018.01)
G06F 9/445       (2018.01)
G06F 9/54        (2006.01)

(52) U.S. Cl.
CPC ............ G06F 9/45558 (2013.01); G06F 8/41 (2013.01); G06F 9/44505 (2013.01); G06F 9/545 (2013.01); *G06F 2009/45562* (2013.01); *G06F 2009/45579* (2013.01); *G06F 2009/45591* (2013.01)

(58) Field of Classification Search
CPC .... G06F 9/45558; G06F 8/41; G06F 9/44505; G06F 9/545; G06F 2009/45562; G06F 2009/45579; G06F 2009/45591; G06F 9/5077; G06F 21/53; G06F 2009/45587
See application file for complete search history.

(56) References Cited

U.S. PATENT DOCUMENTS

| | | | |
|---|---|---|---|
| 2018/0137093 A1* | 5/2018 | Goldfarb ................ | G06N 20/10 |
| 2021/0109775 A1* | 4/2021 | Shen ....................... | G06F 9/545 |
| 2023/0259386 A1* | 8/2023 | Yue ......................... | H04L 63/20 |
| | | | 726/1 |

OTHER PUBLICATIONS

Anil Kurmus et al; Attack Surface Metrics an Automated Compile-Time OS Kernel Tailoring; IBM Research—Aurich; Friedrich-Alexander University Erlagen-Nurnberg; TU Brauschweig.

Seyedhamed Ghavamnia et al; Temporal System Call Specialization for Attack Surface Reduction; Usen X Association; Stony Brook University.

* cited by examiner

*Primary Examiner* — Sisley N Kim
(74) *Attorney, Agent, or Firm* — Michael Ye; Kalos Athena Wang PLLC (57) ABSTRACT

The present invention relates to a container-oriented Linux kernel virtualizing system, at least comprising: a virtual kernel constructing module, being configured to provide a virtual kernel customization template for a user to edit and customize a virtual kernel of a container, and generate the virtual kernel taking a form of a loadable kernel module based on the edited virtual kernel customization template; and a virtual kernel instance module, being configured to reconstruct and isolate a Linux kernel, and operate a virtual kernel instance in a separate address space in response to a kernel request from a corresponding container. The container-oriented Linux kernel virtualizing system of the present invention is based on the use of a loadable module.

14 Claims, 4 Drawing Sheets

CONTAINER-ORIENTED LINUX KERNEL VIRTUALIZING SYSTEM AND METHOD THEREOF

This application claims the benefit of the Chinese Patent Application No. CN 202111097363.8 filed on Sep. 17, 2021, which is hereby incorporated by reference as if fully set forth herein.

BACKGROUND OF THE INVENTION

1. Technical Field

The present invention relates to computer operating systems, and more particularly to a container-oriented Linux kernel virtualizing system and a method thereof.

2. Description of Related Art

Containers represents an emerging, lightweight OS-level virtualizing technology. By merely incorporating applications and a necessary execution environment to accommodate operation of containerized applications, a container can be deployed and run in a host operating system, without the needs of a complete guest operating system and hardware for virtualization. In virtue of the feature of sharing host operating systems, containers can effectively use cloud servers and efficiently distribute and deploy applications in the cloud, thereby providing improved resource usage and operational efficiency. Currently, the container technology has been extensively used in the industrial circles. The traditional cloud services providers offer rich and diverse container services to support fast distribution and deployment of cloud applications. However, with increasingly dense deployment of containers in the cloud environment, container security has come into concern. Meanwhile, as containerized applications see blowout growth in both number and type, there has been a pressing demand for containers about kernel runtime customizability.

In a Linux system environment, containers usually use the namespace and the control group (Cgroup) mechanism provided by a Linux kernel to implement container isolation and resource limitation. However, essentially, a Linux kernel is still shared by all containers of the same host. While sharing of a Linux kernel contribute to desired performance, it prevents containers from customizing their adaptive kernels, and brings tough challenges about container security. Although kernels have added many container-focused security functions, security properties in the kernel layer remain discrete and imperfect, leaving a large room for improvement. To deal with frequent container security incidents, some secure container schemes, like the representative secure container schemes, gVisor and Kata Container, add a complete operating system in the user mode and virtual machine layer for a container, so that the container can be isolated from the host operating system, thereby preventing directly access from the container to the host operating system. These schemes provide an additional protective layer between a container and a host, and between containers, yet they introduce huge overheads. Besides, since each of them depends on a specific operating system kernel, the need of container kernel customizability remains unmet.

To improve native container security and secure container performance, there have been many researchers proposing optimization of shared Linux kernels. For example, an article titled "Attack surface metrics and automated compile-time os kernel tailoring" and Linux kernel tinification are both about management of kernel configurations with the aim to effectively reduce the attack surface of kernels. However, these prior-art custom minimized shared kernels are less customizable and thus unable to satisfy various containers. In addition, while the kernel namespace mechanism isolates some kernel parameters for containers, operation in the namespace of a Linux kernel involves global privilege and can bring about security concerns. To solve this problem, the known Seccomp security mechanism and an article titled "Temporal system call specialization for attack surface reduction" propose technical schemes that prevent a container from making system calls, so as to ensure security. However, global sharing problems about the system call table and system calls remain unsolved. Through permission management of a kernel, access from a container to the kernel can be controlled, but since such permission management applies globally, a container progress may challenge the global system with privileged escape.

Although the prior-art schemes have made some improvements in container security, the inherent problem about global sharing is still waiting for an answer. Without the ability to virtualize of Linux kernels, all the known solutions can do nothing more than optimize and isolate shared Linux kernel. Hence, there is a pressing need for a method to addresses the foregoing security concerns and design defects about a globally shared kernel while ensuring good performance of containers.

Further, since there is certainly discrepancy between the prior art comprehended by the applicant of this patent application and that known by the patent examiners and since there are many details and disclosures disclosed in literatures and patent documents that have been referred by the applicant during creation of the present invention not exhaustively recited here, it is to be noted that the present invention shall actually include technical features of all of these prior-art works, and the applicant reserves the right to supplement the application with technical features known in the art as support.

SUMMARY OF THE INVENTION

To improve native container security and secure container performance, there have been many researchers proposing optimization of shared Linux kernels. For example, an article titled "Attack surface metrics and automated compile-time os kernel tailoring" and Linux kernel tinification are both about management of kernel configurations with the aim to reduce the attack surface of kernels. The known Seccomp security mechanism and an article titled "Temporal system call specialization for attack surface reduction" propose technical schemes that prevent a container from making system calls, so as to ensure security. Although the prior-art schemes have made some improvements in container security, the inherent problem about global sharing is still waiting for an answer. Without the ability to virtualize of Linux kernels, all the known solutions can do nothing more than optimize and isolate shared Linux kernel, leaving outstanding security concerns and design defects to address.

The present invention thus provides a container-oriented Linux kernel virtualizing system featuring a loadable kernel module. By reconstructing various resources in a kernel, and enabling creation of a virtual kernel customized for a container, the present invention provides the container with dedicated virtual kernel resources and security strategy, thereby effectively solving the problem about global sharing of kernels. In the disclosed Linux kernel virtualizing system, the virtual kernel can be loaded and unloaded on demand during the runtime of the container. Furthermore, the virtual kernel instance advantageously operates in the kernel space without significantly increasing overheads but ensuring desired performance of the container. Also, the present invention provides a Linux kernel virtualizing method, which adopts a unified set of standards to forward and process container requests. With this arrangement, modification made to the Linux kernel source code can be minimized, and the overall technical architecture is straightforward and less likely to introduce additional vulnerabilities, thereby ensuring security of the technical architecture. Furthermore, the Linux kernel virtualizing system of the present invention reconstructs and isolates resources, configurations, and parameters of the Linux kernel, thereby providing the virtual kernel with a separate running address space, and performs local integration and optimization on the global security module, thereby significantly improving container security.

The application herein provides a container-oriented Linux kernel virtualizing system, at least comprising: a virtual kernel constructing module, being configured to provide a virtual kernel customization template for a user to edit and customize a virtual kernel of a container, and generate the virtual kernel taking a form of a loadable kernel module based on the edited virtual kernel customization template; and a virtual kernel instance module, being configured to reconstruct and isolate a Linux kernel, and operate a virtual kernel instance in a separate address space in response to a kernel request from a corresponding container.

According to a preferred mode, the system further comprises a virtual kernel loading/unloading module, which is for loading the corresponding virtual kernel into the Linux kernel when the container is launched, maintaining mapping relationship between the container and the virtual kernel, and/or unloading and deleting the virtual kernel when a lifecycle of the container ends.

According to a preferred mode, the system further comprises virtual kernel managing module, which is configured to forward the kernel-call request of the container to the virtual kernel instance for processing, based on a predefined hook collection and a corresponding ftrace callback function, when the container makes a kernel-call request.

According to a preferred mode, the virtual kernel instance module is for creating and initializing the virtual kernel instance, and/or providing the container with virtual kernel services, and/or multiplexing other parts of the Linux kernel.

According to a preferred mode, the virtual kernel instance module at least comprises a reconstruction sub-module and a security sub-module, wherein the reconstruction sub-module is for reconstructing configurations and parameters in the Linux kernel, and/or for calling a call table that has Linux kernel reconstructed; and the security sub-module is for providing the virtual kernel with a separate running address space and performing local integration and optimization on a global security module of the Linux kernel.

According to a preferred mode, the virtual kernel constructing module is further configured to: allow the user to select how the virtual kernel is customized; semantically parse a user-edited customization file so as to generate a virtual kernel source code; compile the virtual kernel source code, so as to output the obtained virtual kernel in the form of a loadable kernel module; and store the virtual kernel in the form of a loadable kernel module into a warehouse for subsequent use.

According to a preferred mode, the virtual kernel constructing module is further configured to: semantically parse the customization file to acquire virtual kernel configurations, parameters, and a call table and write them into the virtual kernel source code; semantically parse call-filtering rules, and write parameter detection obtained from parsing into the corresponding kernel call source code; semantically parse file permission detection rules, and write a file and permission information obtained from parsing into a data structure of the virtual kernel source code; and integrate parts of custom source codes to generate the virtual kernel source code.

According to a preferred mode, the virtual kernel loading/unloading module is further configured to: monitor container operation through a runc runtime, wherein: if creation of a container is monitored, acquiring the corresponding virtual kernel from the virtual kernel warehouse according to a container name of the container; combining the container id of the container and the virtual kernel name to rename a virtual kernel module; loading the virtual kernel module into the Linux kernel; sending an initialization request to the virtual kernel instance module; and loading the corresponding virtual kernel.

The present invention provides a container-oriented Linux kernel virtualizing method, at least comprising: providing a virtual kernel customization template for a user to edit and customize; generating the virtual kernel taking a form of a loadable kernel module based on the virtual kernel customization template; and reconstructing and isolating a Linux kernel, and operating a virtual kernel instance in a separate address space in response to a kernel request from a corresponding container. The container-oriented Linux kernel virtualizing system of the present invention is based on the use of a loadable module. The system provides a customizable, high-performance, secure virtual kernel (vkernel) in the Linux kernel for every container. By virtualizing the Linux kernel, the present invention provides a container with an independent virtual kernel, thereby achieving the purpose of providing a custom virtual kernel for a container in a runtime Linux system. The customized virtual kernel not only ensures high performance of the container, but also significantly enhance security of the container.

According to a preferred mode, the method further comprises: loading the corresponding virtual kernel into the Linux kernel when the container is launched, and maintaining mapping relationship between the container and the virtual kernel, and/or unloading and deleting the virtual kernel when a lifecycle of the container ends.

According to one preferred mode, the step of having the user edit the virtual kernel customization template at least comprises: allowing the user to select how the virtual kernel is customized; if the user decides to customize the virtual kernel according to a custom configuration file, having the user edit and set configurations, parameter, and the call table of the virtual kernel, and/or having the user edit rules of call filtering and file permission detection for the virtual kernel; semantically parsing a user-edited customization file, so as to generate a virtual kernel source code; compile the virtual kernel source code, so as to output the obtained virtual kernel in the form of a loadable kernel module; and store the virtual kernel in the form of a loadable kernel module into a warehouse for subsequent use.

According to one preferred mode, generation of the virtual kernel source code at least comprises: semantically parsing the customization file to acquire virtual kernel configurations, parameters, and a call table and write them into the virtual kernel source code; semantically parsing call-filtering rules, and writing parameter detection obtained from parsing into the corresponding kernel call source code; semantically parsing file permission detection rules, and writing a file and permission information obtained from parsing into a data structure of the virtual kernel source code; and integrating parts of custom source codes to generate the virtual kernel source code.

According to one preferred mode, the method further comprises: monitor container operation through a runc runtime, wherein: if creation of a container is monitored, acquiring the corresponding virtual kernel from the virtual kernel warehouse according to a container name of the container; combining the container id of the container and the virtual kernel name to rename a virtual kernel module; loading the virtual kernel module into the Linux kernel; sending an initialization request to the virtual kernel instance module; and loading the corresponding virtual kernel.

The application herein also provides a container-oriented Linux kernel virtualizing system, at least comprising: a virtual kernel constructing module, being configured to provide a virtual kernel customization template for a user to edit and customize a virtual kernel of a container, and generate the virtual kernel taking a form of a loadable kernel module based on the edited virtual kernel customization template.

The system of the present invention further comprises a virtual kernel instance module, being configured to reconstruct and isolate a Linux kernel, and operate a virtual kernel instance in a separate address space in response to a kernel request from a corresponding container.

According to a preferred mode, the system further comprises a virtual kernel loading/unloading module, which is for loading the corresponding virtual kernel into the Linux kernel when the container is launched, maintaining mapping relationship between the container and the virtual kernel, and/or unloading and deleting the virtual kernel when a lifecycle of the container ends.

According to a preferred mode, the system further comprises virtual kernel managing module, which is configured to forward the kernel-call request of the container to the virtual kernel instance for processing, based on a predefined hook collection and a corresponding ftrace callback function, when the container makes a kernel-call request.

According to a preferred mode, the virtual kernel instance module is for creating and initializing the virtual kernel instance, and/or providing the container with virtual kernel services, and/or multiplexing other parts of the Linux kernel.

According to a preferred mode, the virtual kernel instance module at least comprises a reconstruction sub-module and a security sub-module, wherein the reconstruction sub-module is for reconstructing configurations and parameters in the Linux kernel, and/or for calling a call table that has Linux kernel reconstructed; and the security sub-module is for providing the virtual kernel with a separate running address space and performing local integration and optimization on a global security module of the Linux kernel.

The system provided by the present invention comprises a virtual kernel constructing module, a virtual kernel loading/unloading module, a virtual kernel managing module, and a virtual kernel instance module. The virtual kernel constructing module provide a virtual kernel customization template for a user to edit and customize a virtual kernel of the container, and generating the virtual kernel in the form of a loadable kernel module (LKM) using an automated tool. The virtual kernel loading/unloading module is for loading the corresponding virtual kernel into the Linux kernel when the container is launched, maintaining mapping relationship between the container and the virtual kernel, and/or unloading and deleting the virtual kernel when a lifecycle of the container ends. The virtual kernel managing module defines an entry point for the virtual kernel, and forwards a kernel request to the corresponding virtual kernel for processing. The virtual kernel instance module provides implementation of the virtual kernel, including implementing a reconstruction sub-module and a security sub-module. The reconstruction sub-module reconstructs configurations and parameters in the Linux kernel, and reconstructs the call table of the Linux kernel. The security sub-module provides the virtual kernel with a separate running address space and performs local integration and optimization on a global security module of the Linux kernel (including Capability, Seccomp, and Apparmor). The virtual kernel instance module multiplexes other parts of the Linux kernel at the same time.

DETAILED DESCRIPTION OF THE INVENTION

In order to make the objectives, technical solutions and advantages of the present invention clearer, the present invention will be further described in detail below with reference to the accompanying drawings and embodiments. It should be understood that the specific embodiments described herein are only used to explain but not to limit the present invention. In addition, the technical features involved in the various embodiments of the present invention described below can be combined with each other, provided that there is no mutual conflict.

For ease of understanding, technical terms of the present invention are explained as follows.

A container is an abstract in the application layer, serves to pack code and dependent resources/software into a normalized unit to be used in development, delivery, and deployment. A container image is a lightweight, executable, independent software package, containing everything required for operation of software, such as codes, the runtime environment, system tools, the system library, and configurations. Containerized software is suitable for applications based on Linux and Windows, and can operate consistently in any environment. A container endows software with independence and secure software from environmental differences (e.g., differences in the development environment and the demonstration environment), thereby helping reduce conflicts among teams that run different software programs in the same infrastructure. With a container, virtualization is about the operating system but not the hardware. Plural containers may operation in the same machine and share the same set of operating system resources, but each of them runs as an independent progress in a user space. While a container and a virtual machine have the same advantages about isolation and allocation of resources, the two function differently. As stated above, a container virtualizes the operating system but not the hardware, making it more portable and more efficient. As compared to a virtual machine, a container takes up less space. A container image usually has a size as small as tens of trillions, and thus can be launched instantly. The traditional virtual machine technology is about virtualizing a set of hardware, running a complete operating system on the hardware, and then running required applications on the system. An application progress in a container directly operate on the kernel of the host as a container does not have its own kernel and does not perform hardware virtualization. Therefore, a container is lighter and more portable than a traditional virtual machine.

Operating system-level virtualization (also referred to as OS-level virtualization) is a technology about virtualizing plural servers on an operating system, and supports easy isolation of individual virtual servers on a single operating system. A Linux kernel takes up a single address space, which means any error in the kernel or in any drive program can lead to shutdown of the entire operating system. With virtualization, plural operating systems may be run at the same time. If one of the systems crashes due to errors, Hypervisor (a management program) and other operating systems will not be affected. To debug a kernel is as to debug a user space program.

An operating system is basic support software used to interact with hardware and provide a user program with a limited service set. A computer system is a symbiont of hardware and software. The two are dependent to each other, and indivisible. Computer hardware is composed of peripherals, processors, memory, hard drives, and other electronic devices, functioning like a motor of a computer. However, hardware can only work when it is operated and controlled by software. The software serving to control hardware is called an operating system, which is called "kernel" in the world of Linux (Linux kernel), and is also known as "core." Its function is to send requests made in applications to hardware, and act as an underlying drive program to address various devices and components in the system. Linux kernel is connected downstream with and centrally manage all computer hardware, and provides the system with an interface (API) for a user to call progresses. Modules and components in a Linux kernel may be grouped into several parts: 1. memory management: for tracking and recording what of which size is stored at where in the memory; 2. progress management: for determining which progresses will at what time use the central processor (CPU) for how long; 3. equipment drive programs: for acting as mediation programs/interpretation programs between hardware and progresses; and 4. system calling and security: for receiving service requests from workflows. A Linux kernel works in a kernel space, and from here it allocates memory and tracks the storage locations of all contents. The contents shown to a user (e.g., a Web browser and a file) are in a user space. These applications interact with the kernel through a system call interface (SCI).

A loadable kernel module (LKM) is a mechanism supporting on-demand loading or unloading of kernel source codes, and is applicable in a Linux kernel to provide a container with a custom virtual kernel, thereby adding an additionally protective layer to the container while ensuring good performance of the container. Linux is of a monolithic kernel structure. For redeeming defects of a monolithic kernel in terms of scalability and serviceability, Linux has introduced a dynamic loadable kernel module. A loadable kernel module is used to expand functions of a Linux kernel.

A loadable kernel module may be loaded to or unloaded from the kernel during operation of the system. This module is a program having independent functions. It can be compiled separately, but is unable to run independently. It is linked to the kernel during runtime to act as a part of the kernel and operates in the kernel space. The module is typically composed of a set of functions and data structures, for implementing a file system, a drive program, or other features at the kernel's upper layer.

Every operating system has some functions embedded in the kernel. These functions may be used by every operation of the system, and the functions used by Linux are called system calls (or systemcalls or syscalls), corresponding to conversion between a user and the kernel. A system call is a "special" interface provided by the operating system for a user to call a program. A user program may access services provided by an OS kernel through the "special" interface. For example, a user may open a file, close a file, or read/write a file through calls by giving a request to the system using calls related to the file system; may know or set the system time using clock-related calls; or may create, schedule, and manage progresses using system calls related to progress control.

A kernel symbol table is a dynamic, changeable mapping table making it possible to access an address or a pointer corresponding to a program body through symbols. It contains addresses of all global kernel items (functions and variables). When a module is loaded into a kernel, every symbol it exports will become a part of a public symbol table of the kernel. Every entry of the kernel symbol table represents one introduced (public) kernel symbol, and is accessible to LKM.

A Linux kernel takes up a single address space. This means that any error in the kernel or in any drive program can lead to shutdown of the entire operating system. The kernel-level virtualizing technology (embodied as a kernel-based virtual machine, or KVM) gives the possibility that plural operating systems can operate at the same time. If one of the systems crushes due to some bug, the system management program and other operating systems can still operate as normal.

The namespace mechanism, in brief, provides an abstract of global resources. This is about placing resources into different containers (different namespaces) that are isolated from tach other, and is a common means to implement Linux resource isolation in a Linux kernel. To normal PID, IPC, etc., these system resources become no more global resources, but dedicated to some specific namespace. Resources in one namespace are transparent and invisible to other namespaces. In other words, at the OS level, it is possible that there are two progresses both having the progress numbers as 0, 1, 2 existing in the system at the same time. This is because they are in different namespaces, and thus no conflicts will raise therebetween. A Linux kernel may have plural namespaces, and every namespace has its own, exclusive progresses. For example, with a ps command, only progresses in the present namespace will be listed, and progresses in other namespaces will not be shown. This realizes isolation in a Linux environment. Currently, Linux namespaces are divided into six types, including MNT Namespace, IPC Namespace, Net Namespace, UTS Namespace, PID Namespace, and User Namespace. 1. MNT Namespace: for allowing isolation for disk mountpoints and file systems; 2. IPC Namespace: for allowing isolation for communications among progresses; 3. Net Namespace: for allowing isolation for networks; 4. UTS Namespace: for allowing isolation for host names; 5. PID Namespace: for allowing isolation for progresses; and 6. User Namespace: for allowing isolation for users. Progresses of different users can be isolated from each other using pid namespaces, and different namespaces may contain the same pid.

Cgroup (Control Group) is a mechanism provided by Linux kernels. This mechanism can integrate (or separate) a series of system tasks and their sub-tasks according to specific behaviors to different groups that are rated by resources, thereby providing a united framework for system resource management. In brief, Cgroup can record, limit, isolate resources (specific to physical resources, such as CPU, memory, I/O, etc.) used by progress groups. This is of great significance to the container technology, and is arguably the foundation of implementation of most virtualization tools. Cgroup mainly has the following functions: 1. resources limitation: Cgroup may give quantitative limitation to resources can be used by a progress group. For example, whenever a preset memory threshold is exceeded, OOM (Out of Memory) is reported. 2. prioritization: This is about allocation of the number of CPU time slices and I/O bandwidth of a hard drive, and is actually controlling the priority levels of progresses. 3. resources accounting: A major function of Cgroup is accounting, for example, memory use amount, CPU use time, etc. This function is particularly useful for billing. 4. progress control: Cgroup may execute suspension and resumption of progresses. Cgroup mainly has the following features: 1. Cgroup uses a pseudo file system to implement its API. This allows a user to perform Cgroup organization management through operating files. 2. The operation unit of Cgroup organization management is down to the thread level. To codes of the user mode, it has the authority to create or destroy resources already allocated by the system, thereby realizing re-management and re-allocation of resources. 3. All resource management functions are realized as a "subsystem", with united interfaces. 4. A sub-progress newly created is in the same Cgroup group as the parent progress. Essentially, Cgroup may be regarded as a series of hooks attached to a program by the Linux kernel. In operation of the program, scheduling resources triggers corresponding hooks, thereby realizing tracking and limitation of resources.

OCI (Open Container Initiative) provides two specifications, namely the runtime specification (runtime-spec) and the image specification (image-spec). Runtime-spec describes how to operate filesystem bundles (providing for runtime with the configuration file and the file system necessary for launching a container), thereby defining state description of containers, and operations like creation, deletion, and view of containers. Image-spec stipulates formats and operations of images.

Container runtime refers to creating and operating programs of a container according to online acquired images, for such as launching and stopping the container.

runc is a command line tool (CLI tool) that creates and operates containers according to the OCI standards, and is one of the most extensively used container runtimes. Docker is created based on runc. runc is the core of a docker, and creation, operation, and destruction of containers will eventually be done by calling runc. runc used to have its own guest end, which has been extracted to use as separate tools and libraries. It implements the OCI specification, containing config.json files and the root file system of a container.

A container id is an attribute that every devnode has, and can be assigned using a globally unique identifier (GUID).

Ftrace (function trace) is a debug tracing mechanism, or tracing framework, in a Linux kernel. Ftrace enables Linux to check and trace things inside the kernel, and facilitates locating problems and tracking failures. Ftrace can track kernel crush events, and accurately locate the causes. The entire ftrace framework can be divided into several parts, including the ftrace core framework, RingBuffer, debugfs, Tracepoint, and various Tracers. The ftrace framework is the link to the entire ftrace function, including Tracer registration, RingBuffer control, and more.

A hook (container hook) is an event processing mechanism introduced for container lifecycle management. It serves to hear information about management of container lifecycle, broadcast the information to containers, and execute corresponding callback functions. When a container management hook appears, the management system calls the registered hook handler in the container. A hook is a special news processing mechanism. It monitors various events and news in the system or progresses, intercepts messages sent to target windows, and processes the messages.

Seccomp refers to the secure computing mode. In normal cases, a program may use all syscalls, but this is insecure. For example, one may hijack a program flow and getshell through a syscall of execve. With seccomp, we can forbid some syscalls in the program, so that even if the program flow is hijacked, the hijacker can only call some syscalls.

A kernel page table is a piece of memory in a kernel that is stored in the master kernel page global directory init_mm.pgd(swapper_pg_dir), not directly used by hardware.

The application herein provides a container-oriented Linux kernel virtualizing system, at least comprising a virtual kernel constructing module, a virtual kernel loading/unloading module, a virtual kernel managing module, and a virtual kernel instance module. Preferably, the Linux kernel virtualizing system of the present invention can be, for example, a computer, a server, as well as other devices or systems adopting the Linux kernel virtualizing system. According to an embodiment of the present invention, besides the virtual kernel constructing module, the virtual kernel loading/unloading module, the virtual kernel managing module, and the virtual kernel instance module, the Linux kernel virtualizing system may further include other components such as a central processing unit, a communication unit, a storage unit, and an I/O unit. The virtual kernel constructing module, the virtual kernel loading/unloading module, the virtual kernel managing module, and the virtual kernel instance module are connected with the central processing unit, respectively, and all perform information exchange with it. Alternatively, for example, the virtual kernel constructing module, the virtual kernel loading/unloading module, the virtual kernel managing module, and the virtual kernel instance module are connected with each other successively so as to perform information exchange.

For example, general-purpose processors, digital signal processors (DSPs), application specific integrated circuits (ASICs), field programmable gate arrays (FPGAs) or other programmable logic devices, discrete gate or transistor logic, discrete hardware components or any combination thereof for performing the functions described herein can be used to implement or execute the various exemplary logical blocks, modules, and circuits described according to the present disclosure. A general-purpose processor may be a microprocessor, or, alternatively, any common processor, controller, microcontroller, or state machine. A processor may also be implemented as a combination of computing devices, e.g., a combination of a DSP and a microprocessor, a combination of multiple microprocessors, a combination of one or more microprocessors and a DSP core, or any other such configuration. Exemplarily, embodiments of the present disclosure may be described in the context of machine-executable instructions, such as those included in program modules executed by the components on a real or virtual target processor. Generally, program modules include routines, programs, libraries, objects, classes, components, data structures, etc., that perform particular tasks or implement particular abstract data structures. In various embodiments, the functionality of the program modules can be combined or divided among them. Machine-executable instructions for program modules may be executed within local or distributed devices. In the latter case, program modules can be located both in local and remote storage medium.

A virtual kernel constructing module is used to customize and generate virtual kernel for different containers.

For realizing private custom of virtual kernels, the virtual kernel constructing module is configured to provide a user with customization templates for kernel configurations, parameters, call tables, and security properties. A user may edit and customize these templates according to his/her container requirements, so as to obtain a virtual kernel customization file. The templates cover kernel configurations, parameters, call tables, and security properties of kernels.

The virtual kernel constructing module includes an automated construction tool. The automated construction tool acquires the virtual kernel customization file and performs smart semantic parsing on it, so as to generate a customized virtual kernel source code. The automated construction tool automatically compiles the virtual kernel source code, and outputs a virtual kernel in the form of a loadable kernel module.

With the virtual kernel constructing module, the present invention provides one-stop container virtual kernel customizing services. A user only has to edit the provided template, and the automated tool can generate a custom virtual kernel in the form of a loadable module. The tool is easy to operate and prepared for various container customization needs.

The virtual kernel loading/unloading module is used to load and unload the customized virtual kernel according to container lifecycle. The virtual kernel loading/unloading module monitors container operations based on the runc container runtime of Open Container Initiative.

As to container creation, the virtual kernel loading/unloading module loads the virtual kernel into the Linux kernel before launch of the container is completed. As to container destruction, the virtual kernel loading/unloading module unloads and deletes the virtual kernel from the container immediately.

For preventing conflicts among containers in a Linux kernel caused by their using loadable kernel modules with the same name, according to the present invention, the virtual kernel loading/unloading module can rename virtual kernels in the Linux kernel based on the container id. After solving the naming conflict by means of the renaming mechanism, the PID namespace of the container and the virtual kernel are linked so as to conduct mapping between the container and the virtual kernel. The container-id-based virtual kernel renaming mechanism refers to renaming the loadable virtual kernel module based on the container id, so as to effectively prevent duplicate-name conflicts in the Linux kernel, and support the operation of loading an independent virtual kernel for every container.

With the virtual kernel loading/unloading module, the present invention realizes adaptive virtual kernel loading/unloading management based on container lifecycle. By using runc runtime, the system monitors container operation and realize automatically loading and unloading of virtual kernels. Since runc runtime is general and popular, the present invention can be readily integrated into extensive container management tools. In addition, as mapping relationship between containers and virtual kernels is realized based on container PID namespaces, container requests can be forwarded to corresponding virtual kernels for processing.

The virtual kernel managing module is configured to manage virtual kernel entry points, and forward kernel requests to virtual kernels. The virtual kernel managing module operates in the Linux kernel, predefines a hook collection for generating virtual kernel entry points. Through the kernel symbol table (kallsyms), the address of a corresponding call in the kernel can be acquired, thereby activating the ftrace mechanism for kernel calls in the hook collection to generate virtual kernel entry points. The ftrace callback function in the hook collection for kernel call forwards kernel call request of the container to the virtual kernel for processing.

Therein, the kernel symbol table refers to a symbol table of functions and variables inside the kernel to be cited externally. The kernel symbol table is created during start of the kernel and is updated in a rea-time basis. It reflects the current, latest state of the system, and it also contains names of functions and variables exported by the kernel or loaded modules.

When a container requests to call a kernel, the virtual kernel managing module, based on a predefined hook collection and corresponding ftrace callback functions, forwards the kernel call request of the container to a virtual kernel instance for processing.

With the virtual kernel managing module, the present invention centrally manages virtual kernel entry points, thereby effectively enhancing system robustness and scalability. This effectively decouples the system from the Linux kernel, so as to prevent modification of the Linux source code, and prevent Linux kernel update caused by system update. Additionally, the virtual kernel managing module operates in the Linux kernel, and thus effectively ensures that a kernel call can be forwarded to the virtual kernel efficiently, without introducing additional overheads.

The virtual kernel instance module is implementation of a virtual kernel. It comprises a reconstruction sub-module and a security sub-module. The virtual kernel instance module is for creating and initializing virtual kernel instances, and providing virtual kernel services to containers.

The reconstruction sub-module is for reconstructing configurations, parameters, and call tables of virtual kernels. The security sub-module is for providing separate address spaces and performing local integration and optimization on the global security module.

The reconstruction sub-module reconstructs Linux kernel configurations, and provides containers with independent virtual kernel configurations that come into effect in corresponding virtual kernel calls. The reconstruction sub-module creates a configuration structure body to reconstruct kernel configurations, so that every container can have its independent virtual kernel configurations. In the process that the virtual kernel is loaded into the Linux kernel, the configuration structure body conducts initialization according to user custom settings. During operation of a virtual kernel instance, container kernel requests involving kernel configurations will be forwarded to the virtual kernel instance. Then the virtual kernel configurations in the configuration structure body are acquired, so as to eventually make the reconstruct configurations effective in the kernel.

The reconstruction sub-module reconstructs Linux kernel parameters, and provides a container with local virtual kernel parameters. It allows the container to independently set its parameters and makes the parameters effective in virtual kernel calls. The reconstruction sub-module creates a parameter structure body to reconstruct kernel parameters, so that every container has its independent virtual kernel parameters. The virtual kernel managing module is for intercepting kernel functions that need to access the parameters, and redirecting them to the corresponding parameters in the parameter structure body of the virtual kernel, thereby making the virtual kernel parameters effective.

The reconstruction sub-module also reconstructs the call table of the Linux kernel, and provides every container with an independent virtual kernel call table and isolated virtual kernel calls. The reconstruction sub-module generates virtual kernel private system call tables for containers. It shields some system call table items and revises some system calls to redirect to reconstructed kernel system call functions. The virtual kernel managing module is for intercepting kernel system call entry points, and redirecting the system calls in the container to the virtual kernel private system call tables, and jumps to corresponding system calls for processing.

The security sub-module uses an independent page table to restrict the virtual kernel addressing range of a container, thereby providing isolated virtual kernel address spaces. Specifically, the system, based on the kernel page table isolation mechanism, generates an independent page table for a loadable kernel module. The kernel address spaces mapped to the page table include core kernel cages like the kernel text cage, the CPU entry point cage, current progress data, the memory cage of the current kernel module, and the memory cage assigned for the independent page table. When operation reaches the virtual kernel code, the page table is switched to the independent page table generated by the present system, so as to restrict the virtual kernel addressing range in the independent page table.

The security sub-module maintains permission of containers and realizes permission detection at the virtual kernel layer. Herein, the container permission includes kernel function permission, system call access permission, and file access permission. The security sub-module creates independent function permission structure body that maintains Capability of the container layer. When checking kernel function permission, it reads a function permission structure body in the virtual kernel for examination, so as to effectively prevent privileged escape conducted by container progresses. The security sub-module uses the static writing technology to implement the system call filtering mechanism of Seccomp in the virtual kernel source code. Based on the user-configured system call filtering rules, a corresponding virtual kernel source code is generated, and the items of the virtual kernel system call table corresponding to the shielded system calls are cleaned out. Then the parameters are filtered and packed at the outside of the corresponding system calls. The security sub-module, based on the index node virtualizing technology, realizes file permission detection for Apparmor. According to the custom file permission rules, a collection of index node numbers and permission information is maintained in the virtual kernel. By identifying a corresponding index node to trigger file permission detection in the virtual kernel, so as to prevent unnecessary global detection for all files. When a container accesses a file, the first thing is to determine whether there is a zone bit for the corresponding index node. If not, permission detection will not be performed. Otherwise, according to the index node number, permission maintained in the virtual kernel instance is acquired to make a request for permission detection.

As used in the present invention, the static writing technology refers to the technology for writing configuration information into a source code. This specially comprises automatically analyzing user configurations, extracting configuration contents and filling the contents into a source code template, and eventually outputting a synthetized source code.

In the present invention, Capability refers to that the kernel finely divides the root privilege into different function groups. The similar function groups maintain permission for a set of similar kernel functions. Only a progress having the function group can access the corresponding kernel functions.

As used in the present invention, the call filtering mechanism refers to that the kernel before processing a system call performs examination based on filtering rules corresponding to the request source. If the system call is not in the whitelist or the parameters fail to meet requirements, the request is screened out and returned directly. Otherwise, the kernel enters the system call for processing.

As used in the present invention, the index node virtualizing technology refers to adding a virtualization zone bit into the structure of an index node. If this bit is not zero, it indicates that the permission information is independently maintained in the virtual kernel.

As used in the present invention, Apparmor refers to a Linux security mechanism based on mandatory access control. It is mainly applied to mandatory access control for container file requests.

As used in the present invention, file permission detection refers to that during operation of a file, permission for the request source has to be detected, and if the request source has the permission required for operating the file, the request source is allowed to operate the file, or otherwise, the requested operation on the file is rejected for insufficient permission. File permission detection helps prevent malicious file access from malicious containers.

By configuration the virtual kernel instance module, the present invention creates and manages private virtual kernel configurations, parameters, and kernel call tables for containers in the reconstruction sub-module, and makes these private settings effective during corresponding virtual kernel calls. The components of the reconstruction sub-module work synergistically to provide a container with a private virtual kernel environment and make it effective during processing of the kernel request. The security sub-module makes a virtual kernel instance operate in a separate address space, and implements the container-layer permission detection mechanism. With the efficient call-filtering mechanism based on the static writing technology, and the file permission detection mechanism based on index node virtualization, local integration and optimization are performed on the Linux kernel global security module (including Capability, Seccomp, and Apparmor), so as to realize permission detection and access control for virtual kernels, further ensuring container security.

The container-oriented Linux kernel virtualizing method proposed by the present invention at least includes steps S1 to S8. Although the Linux kernel virtualizing method in embodiments of the present invention are depicted in a particular order, this should not be construed as requiring that such operations be performed in the particular order as shown or in a sequential order, or that all illustrated operations must be performed to achieve the desired result. In some cases, multitask or parallel processing may be beneficial. Likewise, although the above discussion contains some specific implementation details, these should not be construed as limits to the scope of invention or claims, but rather as descriptions about specific embodiments of specific inventions. Certain features in the aforesaid description that are described in different embodiments can also be implemented integrally in one single embodiment. Conversely, various features from each embodiment can also be implemented separately in multiple embodiments or in any suitable combination thereof.

S1: The user selects how the virtual kernel is customized. If the user selects to use a custom configuration file, the method turns to S2; otherwise turn to S3.

S2: The user edits and sets the configurations, the parameters, and the call table of the virtual kernel.

S3: The user edits rules for virtual call filtering and file permission detection.

S4: The user uses the customization file obtained through semantic parsing to acquire the configurations, the parameters, and the call table of the virtual kernel and writes them into the virtual kernel source code.

S5: The call filtering rules are semantically parsed and the obtained parameter detection is written into the corresponding kernel call source code.

S6: The file permission detection rules are semantically parsed and the obtained file and permission information are written into the data structure of the virtual kernel source code.

S7: The parts of the custom source code are integrated into the virtual kernel source code.

S8: The virtual kernel source code is compiled to output the virtual kernel in the form of a loadable kernel module, and the loadable kernel module is stored into the warehouse for subsequent use, and then the method ends.

Figure 1:
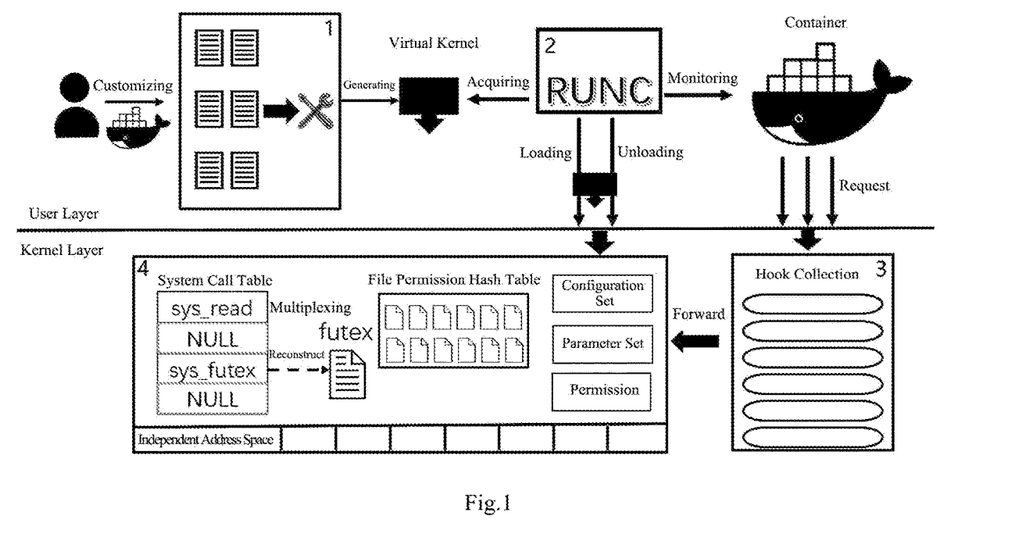
FIG. 1 is a schematic drawing illustrating the principle of a Linux kernel virtualizing system of the present invention.
Figure 2:
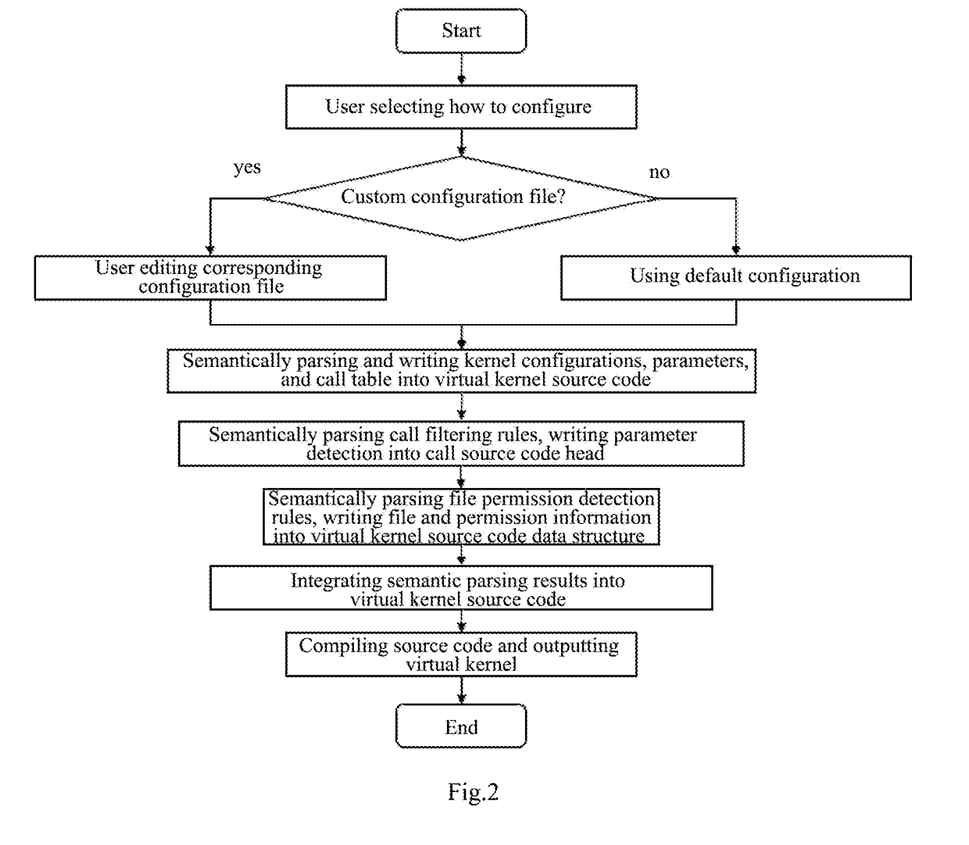
FIG. 2 is a flowchart of data processing executed by a virtual kernel constructing module in the Linux kernel virtualizing system of the present invention.
Figure 3:
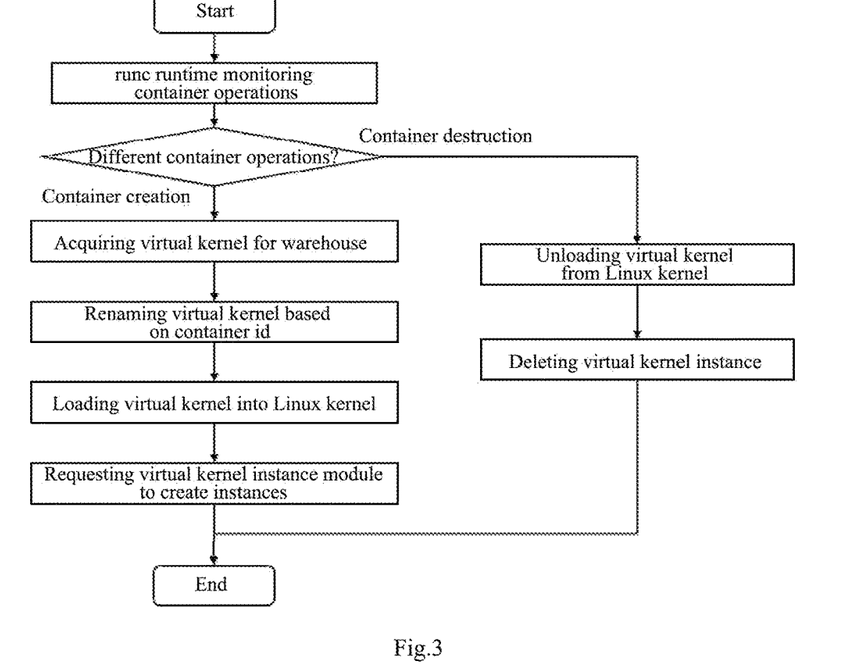
FIG. 3 is a flowchart of data processing executed by a virtual kernel loading/unloading module in the Linux kernel virtualizing system of the present invention.

The method further comprises steps S101 to S109, as shown in FIG. 3. The steps S101 to S109 may be executed by the virtual kernel loading/unloading module.

S101: runc runtime monitors container operation. If the operation is to create a container, the method turns to S102. If the operation is to destroy a container, the method turns to S107.

S102: According to the container name, the corresponding virtual kernel is acquired from the virtual kernel warehouse.

S103: The container id and the virtual kernel name are combined to rename the virtual kernel module.

S104: The virtual kernel module is loaded into the Linux kernel.

S105: An initialization request is sent to the virtual kernel instance module.

S106: The virtual kernel is loaded, and the method turns to S109.

S107: The virtual kernel is unloaded from the Linux kernel.

S108: The virtual kernel instance is deleted, and the method turns to S109.

S109: The method ends.

Figure 4:
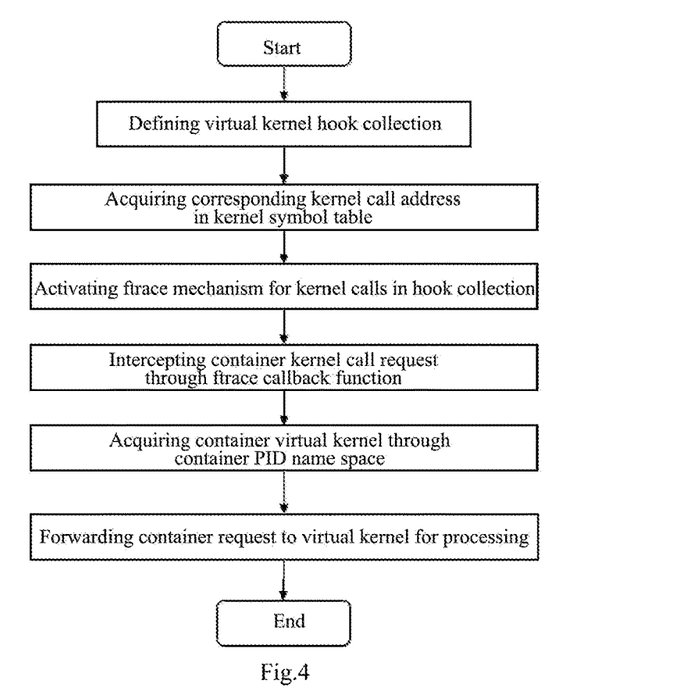
FIG. 4 is a flowchart of data processing executed by a virtual kernel managing module in the Linux kernel virtualizing system of the present invention.

The method further comprises steps S201 to S207, as shown in FIG. 4. The steps S201 to S207 may be executed by the virtual kernel managing module.

S201: A virtual kernel hook collection is defined.

S202: A corresponding kernel call address is acquired from the kernel symbol table (kallsyms).

S203: The ftrace mechanism is activated for a kernel call in the hook collection.

S204: The container kernel call request is intercepted through the ftrace callback function.

S205: The container virtual kernel is acquired through the container PID namespace.

S206: The container request is forwarded to the virtual kernel for processing.

S207: The method ends.

The method further comprises steps S301 to S307. The virtual kernel instance module is further configured to execute the steps S301 to S307.

S301: The virtual kernel configurations are reconstructed. A virtual kernel configuration collection is created to maintain the custom virtual kernel configurations.

S302: The virtual kernel parameters are reconstructed. A virtual kernel parameter collection is created to maintain the custom virtual kernel parameters.

S303: The virtual kernel call is reconstructed. A virtual kernel call table is created and maintained. The supported items in the virtual kernel call table are initialized. The table items corresponding to the shielded virtual kernel calls are each given a null value. The reconstructed virtual kernel calls are loaded, and the call addresses are filled into the table items of the corresponding virtual kernel call table.

S304: The virtual kernel address space is isolated. The related structure in the virtual kernel address space is created, and the Linux kernel core memory is mapped and added into the page table.

S305: The virtual kernel permission is detected. The virtual kernel highest permission structure is created and initialized as container permission. Permission detection is performed in the virtual kernel layer.

S306: The virtual kernel calls are filtered. The filtering rules for the kernel calls are integrated into the virtual kernel call table, and parameter detection is performed in the virtual kernel call source code.

S307: The virtual kernel file permission is detected. The permission Hash table is initialized and the custom file permission is stored. The virtualizing zone bit for the corresponding file index node is set. The virtual kernel file permission is detected by: determining the index node virtualizing zone bit, and reading the file permission in the Hash table for detection.

Figure 5:
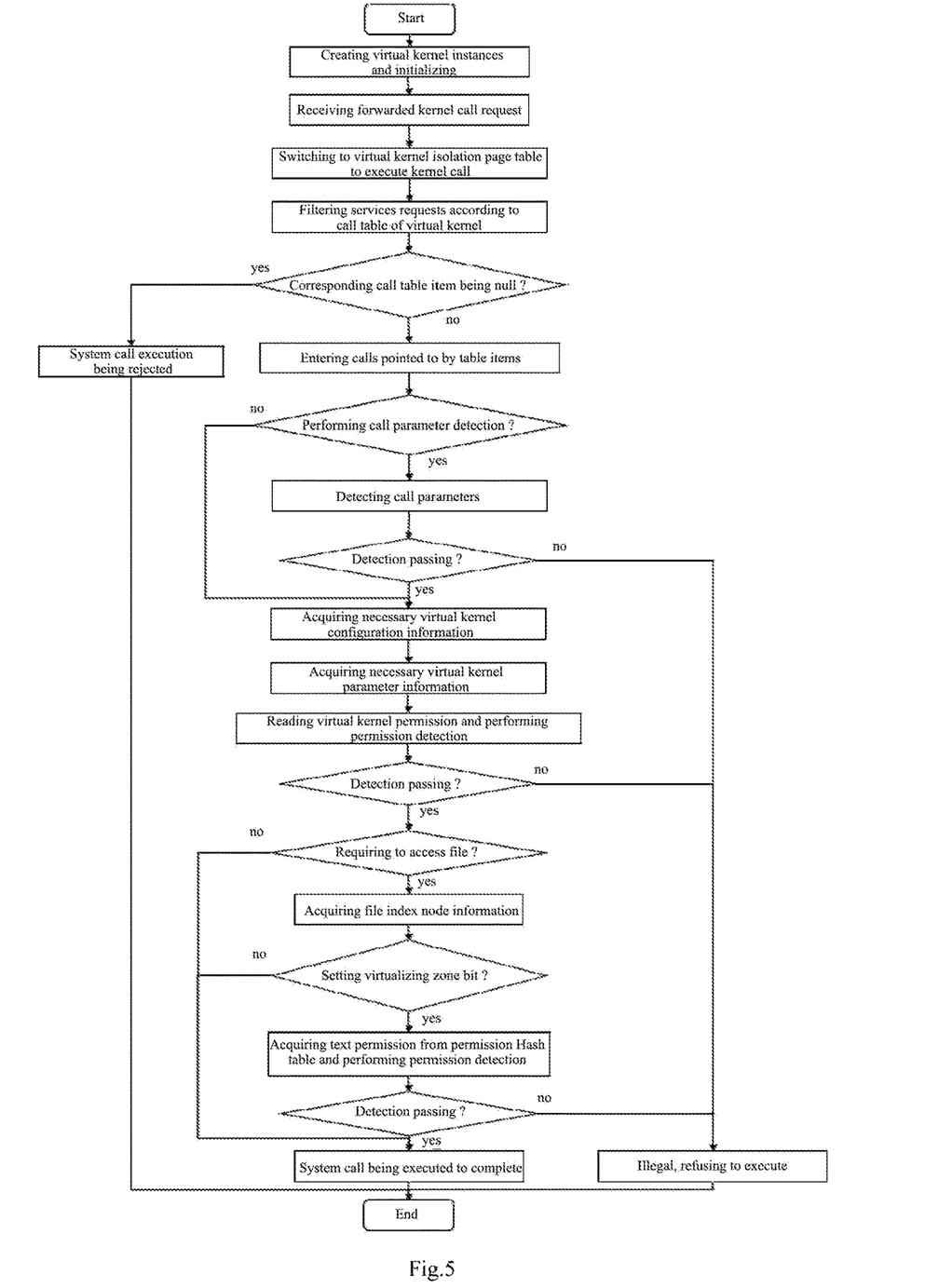
FIG. 5 is a flowchart of data processing executed by a virtual kernel instance module in the Linux kernel virtualizing system of the present invention.

The method further comprises steps S401 to S4013, as shown in FIG. 5. The steps S401 to S4013 may be executed by the virtual kernel instance module.

S401: The virtual kernel instance module receives request from the virtual kernel loading/unloading module, and creates a virtual kernel instance and initializes it.

S402: The virtual kernel instance receives the forwarded kernel call request, and switches the page table to the virtual kernel page table. The kernel call is executed in the isolation page table. As used in the present invention, the virtual kernel page table and the isolation page table each represent an independent page table.

S403: The call request is filtered through the private system call table in the virtual kernel generated according to user configurations. If the table item of the corresponding call is not null, the method turns to S404. Otherwise, the call request not supported is rejected and the method turns to the step S4013.

S404: The call pointed by the virtual kernel call table item is entered to determine whether parameter detection has to be performed. If yes, the method turns to the step S405. Otherwise, the method turns to the step S406.

S405: The system call parameters are detected according to the system call parameter rules set by the user. If the detection passes, the method turns to the step S406. Otherwise, the illegal parameter is rejected and the method turns to the step S4013.

S406: The kernel functions for accessing the global kernel configurations are redirected to the functions re-implemented in the virtual kernel, and virtual kernel configuration information is acquired from the virtual kernel.

S407: The kernel functions for accessing the global kernel parameters are redirected to the functions re-implemented in the virtual kernel, and the virtual kernel parameter information is acquired from the virtual kernel.

S408: The global permission checking functions are redirected to the reconstructed permission checking functions. The virtual kernel permission is acquired from the virtual kernel container corresponding to the container and permission detection is performed. If the permission detection passes, the method turns to the step S409. Otherwise, the broken access is rejected, and the method turns to the step S4013.

S409: It is determined whether the call needs to access the file. If it needs to access the file, the method turns to the step S4010. Otherwise, the method turns to the step S4012.

S4010: The file index node information is acquired. The virtualizing zone bit is checked to determine whether the container activates the virtual kernel index node permission virtualizing function. If there is a virtualizing zone bit, the method turns to the step S4011. Otherwise, the method turns to the step S4012.

S4011: The permission is acquired from the permission Hash table according to the index node information, and permission detection is performed. If the permission detection passes, the method turns to the step S4012. Otherwise, the file operation is rejected for insufficient permission, and the method turns to the step S4013.

S4012: The system call continues to execute, and then the method ends.

S4013: The system call is rejected from execution, and the method ends

The virtual kernel constructing module is further configured to execute steps S501 to S503.

S501: The virtual kernel is customized. According to container requirements, the user edits templates for the configurations, the parameters, the call table, and the security properties of the virtual kernel to perform private customization of the virtual kernel.

S502: The virtual kernel source code is generated. Based on the user customization file, smart semantic parsing is performed. According to parsing results, the custom virtual kernel source code is generated automatically.

S503: The virtual kernel is compiled. The virtual kernel source code is compiled to output the virtual kernel in the form of a loadable kernel module, and the virtual kernel is stored into the virtual kernel warehouse for subsequent use.

The virtual kernel managing module is further configured to execute steps S601 to S604.

S601: The virtual kernel is loaded. If runc runtime monitors a container creation operation, virtual kernel loading is triggered. Before launch of the container is completed, the corresponding virtual kernel is acquired from the virtual kernel warehouse, and the virtual kernel loading request is sent to the Linux kernel.

S602: The virtual kernel is renamed. Before the Linux kernel loads the virtual kernel, the container id and the virtual kernel name are combined to rename the virtual kernel.

S603: The virtual kernel is mapped. After the virtual kernel is loaded, the PID namespace of the container is acquired, and the virtual kernel is assigned into the virtual kernel structure in the container PID namespace.

S604: The virtual kernel is unloaded. If runc runtime monitors a container destruction operation, it sends a virtual kernel unloading and deleting request to the Linux kernel immediately.

In the Linux kernel virtualizing method of the present invention, the user first has to edit a virtual kernel configuration template in the virtual kernel constructing module to generate the virtual kernel in the form of a loadable kernel module. Then when the user operates the container, the virtual kernel loading/unloading module loads the virtual kernel into the Linux kernel in response to a container creation operation, and when the container is to be destroyed, the corresponding virtual kernel is deleted from the Linux kernel. During container operation, the virtual kernel managing module intercepts the kernel request of the container and forwards it to the virtual kernel instance module for processing. The virtual kernel instance module reconstructs the Linux kernel and performs integration and optimization on the global security mechanism. Then the kernel request of the corresponding container is responded.

Specifically, the user first edits templates for the kernel configurations, the parameters, the call table, and the security properties of the virtual kernel according to container requirements, so as to realize customization of the virtual kernel.

The automated construction tool performs smart semantic parsing on the customization file of the virtual kernel so as to generate the virtual kernel source code. Then the virtual kernel source code is compiled so as to output the virtual kernel in the form of a loadable kernel module.

The virtual kernel loading/unloading module monitors container operations based on runc runtime.

The virtual kernel loading/unloading module loads the corresponding virtual kernel module before launch of the container is completed, and if a container is to be destroyed, its virtual kernel is unloaded and deleted.

When the container requests to call the kernel, the virtual kernel managing module, based on the predefined hook collection and the corresponding ftrace callback functions, forwards the container kernel call request to the virtual kernel instance for processing.

The virtual kernel instance module creates and initializes the virtual kernel instance, and provides virtual kernel services to the container.

The reconstruction sub-module of the virtual kernel instance module reconstructs the configurations, the parameters and calls of the virtual kernel.

The security sub-module of the virtual kernel instance module provides the independent address space and performs local integration and optimization on the global security module.

It should be noted that the above-mentioned specific embodiments are exemplary, and those skilled in the art can come up with various solutions inspired by the disclosure of the present invention, and those solutions also fall within the disclosure scope as well as the protection scope of the present invention. It should be understood by those skilled in the art that the description of the present invention and the accompanying drawings are illustrative rather than limiting to the claims. The protection scope of the present invention is defined by the claims and their equivalents. The description of the present invention contains a number of inventive concepts, such as "preferably", "according to a preferred mode" or "optionally" all indicate that the corresponding paragraph discloses an independent idea, and the applicant reserves the right to file a divisional application based on each of the inventive concepts.

What is claimed is:

1. A container-oriented Linux kernel virtualizing system, at least comprising:
   a virtual kernel constructing module, being configured to provide a virtual kernel customization template for a user to edit and customize a virtual kernel of a container, and generate the virtual kernel taking a form of a loadable kernel module based on the edited virtual kernel customization template; and
   a virtual kernel instance module, being configured to reconstruct and isolate a Linux kernel, and operate a virtual kernel instance in a separate address space in response to a kernel request from a corresponding container, wherein the system further comprises a virtual kernel loading/unloading module, which is for loading the corresponding virtual kernel into the Linux kernel when the container is launched, maintaining mapping relationship between the container and the virtual kernel, and/or unloading and deleting the virtual kernel when a lifecycle of the container ends; and
   a virtual kernel managing module, which is configured to:
   intercept a kernel-call request made by the container, and when the container makes a the kernel-call request, based on a predefined hook collection and a corresponding ftrace callback function, forward the kernel-call request of the container to the virtual kernel instance for processing.

2. The system of claim 1, wherein the virtual kernel instance module is for creating and initializing the virtual kernel instance, and/or providing the container with virtual kernel services, and/or multiplexing other parts of the Linux kernel.

3. The system of claim 2, wherein the virtual kernel instance module at least comprises a reconstruction sub-module and a security sub-module, wherein
   the reconstruction sub-module is for reconstructing configurations and parameters in the Linux kernel, and/or for calling a call table that has Linux kernel reconstructed; and
   the security sub-module is for providing the virtual kernel with a separate running address space and performing local integration and optimization on a global security module of the Linux kernel.

4. The system of claim 3, wherein the virtual kernel constructing module is further configured to:
   allow the user to select how the virtual kernel is customized;
   semantically parse a user-edited customization file so as to generate a virtual kernel source code;
   compile the virtual kernel source code, so as to output the obtained virtual kernel in the form of a loadable kernel module; and
   store the virtual kernel in the form of a loadable kernel module into a warehouse for subsequent use.

5. The system claim 4, wherein the virtual kernel constructing module is further configured to:
   semantically parse the customization file to acquire virtual kernel configurations, parameters, and a call table and write them into the virtual kernel source code;
   semantically parse call-filtering rules, and write parameter detection obtained from parsing into the corresponding kernel call source code;
   semantically parse file permission detection rules, and write a file and permission information obtained from parsing into a data structure of the virtual kernel source code; and
   integrate parts of custom source codes to generate the virtual kernel source code.

6. The system of claim 5, wherein the virtual kernel loading/unloading module is further configured to:
   monitor container operation through a runc runtime, wherein:
   if creation of a container is monitored, acquiring the corresponding virtual kernel from the virtual kernel warehouse according to a container name of the container;
   combining the container id of the container and the virtual kernel name to rename a virtual kernel module;
   loading the virtual kernel module into the Linux kernel;
   sending an initialization request to the virtual kernel instance module; and
   loading the corresponding virtual kernel.

7. A container-oriented Linux kernel virtualizing method, at least comprising:
   providing a virtual kernel customization template for a user to edit and customize;
   generating the virtual kernel taking a form of a loadable kernel module based on the virtual kernel customization template; and
   reconstructing and isolating a Linux kernel, and operating a virtual kernel instance in a separate address space in response to a kernel request from a corresponding container; and
   the method further comprising loading the corresponding virtual kernel into the Linux kernel when the container is launched, and maintaining mapping relationship between the container and the virtual kernel, and/or unloading and deleting the virtual kernel when a lifecycle of the container ends;
   intercepting a kernel-call request made by the container; and
   when the container makes the kernel-call request, based on a predefined hook collection and a corresponding ftrace callback function, forwarding the kernel-call request of the container to the virtual kernel instance for processing.

8. The method of claim 7, further comprising:
   the virtual kernel instance module creating and initializing the virtual kernel instance, and/or providing the container with virtual kernel services, and/or multiplexing other parts of the Linux kernel.

9. The method of claim 8, wherein the virtual kernel instance module at least comprises a reconstruction sub-module and a security sub-module, wherein
   the reconstruction sub-module is for reconstructing configurations and parameters in the Linux kernel, and/or for calling a call table that has Linux kernel reconstructed; and
   the security sub-module is for providing the virtual kernel with a separate running address space and performing local integration and optimization on a global security module of the Linux kernel.

10. The method of claim 9, further comprising:
    allowing the user to select how the virtual kernel is customized;
    semantically parsing a user-edited customization file so as to generate a virtual kernel source code;

compiling the virtual kernel source code, so as to output the obtained virtual kernel in the form of a loadable kernel module; and storing the virtual kernel in the form of a loadable kernel module into a warehouse for subsequent use.

11. The method of claim 10, further comprising:

semantically parsing the customization file to acquire virtual kernel configurations, parameters, and a call table and writing them into the virtual kernel source code;

semantically parsing call-filtering rules, and write parameter detection obtained from parsing into the corresponding kernel call source code;

semantically parsing file permission detection rules, and writing a file and permission information obtained from parsing into a data structure of the virtual kernel source code; and integrating parts of custom source codes to generate the virtual kernel source code.

12. The method of claim 11, further comprising:

monitoring container operation through a runc runtime, wherein:

if creation of a container is monitored, acquiring the corresponding virtual kernel from the virtual kernel warehouse according to a container name of the container;

combining the container id of the container and the virtual kernel name to rename a virtual kernel module;

loading the virtual kernel module into the Linux kernel;

sending an initialization request to the virtual kernel instance module; and loading the corresponding virtual kernel.

13. The method of claim 12, wherein the virtual kernel loading/unloading module renames virtual kernels in the Linux kernel based on the container id, after solving the naming conflict by means of the renaming mechanism, the PID namespace of the container and the virtual kernel are linked so as to conduct mapping between the container and the virtual kernel.

14. The method of claim 13, wherein the virtual kernel managing module is configured to manage virtual kernel entry points, and forward kernel requests to virtual kernels;

the virtual kernel managing module operates in the Linux kernel, predefines a hook collection for generating virtual kernel entry points.

* * * * *